May 7, 1963 R. J. MURRAY 3,088,202
METAL CUTTING METHOD AND APPARATUS
Filed Dec. 11, 1959
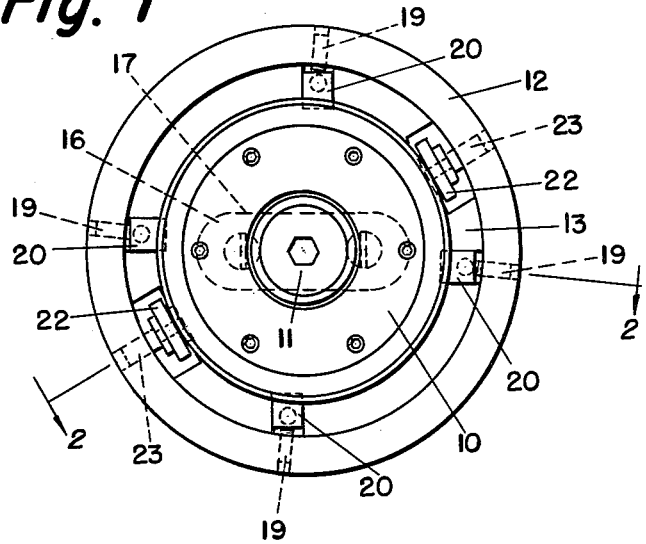
Fig. 1
Fig. 3
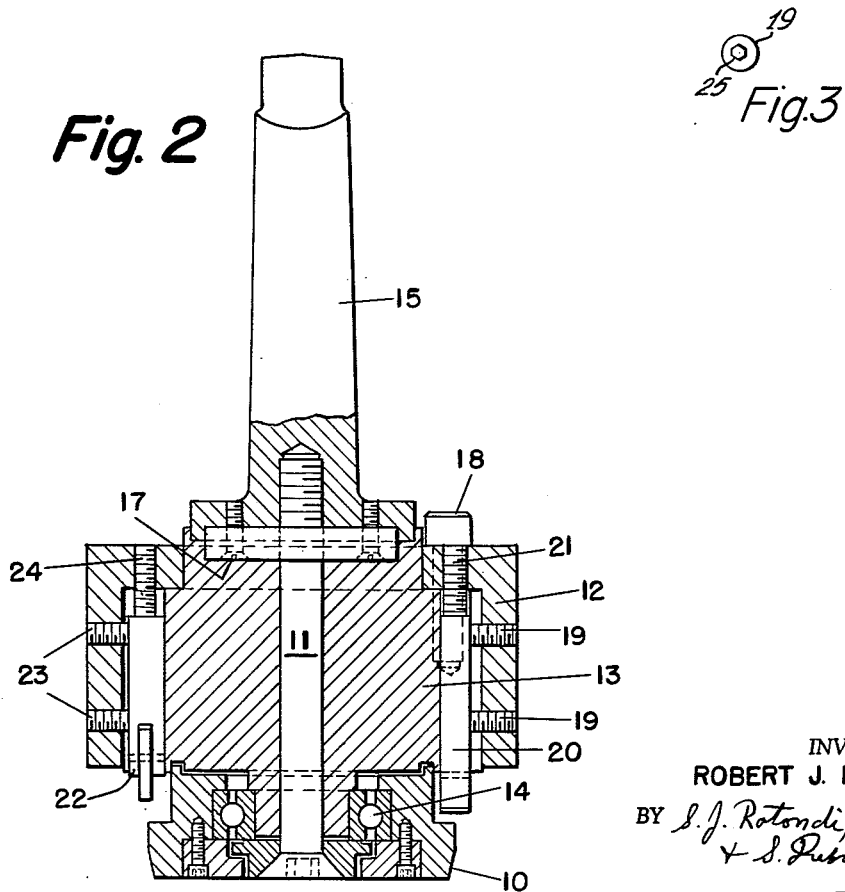
Fig. 2
INVENTOR.
ROBERT J. MURRAY
BY *S. J. Rotondi, A. J. Dupont*
*& S. Dubroff*
ATTORNEYS.

3,088,202
Patented May 7, 1963

1

3,088,202
METAL CUTTING METHOD AND APPARATUS
Robert J. Murray, Olean, N.Y., assignor to the United States of America as represented by the Secretary of the Army
Filed Dec. 11, 1959, Ser. No. 859,075
1 Claim. (Cl. 29—567)
(Granted under Title 35, U.S. Code (1952), sec. 266)

The invention described herein may be manufactured and used by or for the Goverment for governmental purposes without the payment to me of any royalty thereon.

This invention relates to the cutting of metal, and has for its principal object the provision of an improved metal cutting method and apparatus which greatly facilitate the final mouth trimming operation on brass or steel cartridge cases and similar tubular objects.

In the final mouth trimming operation on metallic cartridge cases, the removed metal tends to take the form of long, thin streamers. These streamers have a way of collecting in the cutting area so that the machine must be stopped at frequent intervals to permit their removal. Being rather long, they entwine about the various parts of the machine presenting a safety hazard and rendering their removal difficult.

In accordance with the present invention this difficulty is avoided by the provision of a method and apparatus whereby the surface to be cut, or a part of such surface, is indented to a predetermined depth and is thereafter cut to a depth slightly greater than that of the indentations. These indentations are produced by knurlers which are rotated with and precede the cutters. Use of this method greatly facilitates the cutting operation in that the removed metal takes the form of rather short and tightly wound curls. As a result, disposition of the removed metal is facilitated and rendered less hazardous, the interruptions in the operation of the machine are less frequent and production is correspondingly increased.

The invention will be better understood from the following description when considered in connection with the accompanying drawings and its scope is indicated by the appended claim.

Referring to the drawings:

FIG. 1 illustrates the metal cutting device as viewed from the end presented to the metal to be cut, FIG. 2 is a sectional view taken on the line 2—2 of FIG. 1, and FIG. 3 is an end view of the tool adjusting and clamping screws.

The device illustrated by these figures includes a pilot or guide member 10 fixed to a shaft 11 and having a radial extension adapted to be received into the opening which is to have its edges trimmed. A support means or tool holder comprising a cap 12 and a body 13 is rotatable about the shaft 11 and is rotatably coupled to the pilot member 10 through a roller bearing 14. For rotating the holder 12—13 a driving shank 15 is provided at its lower end with a raised section 16 which fits into a recess 17 (see FIG. 1) in the upper surface of the body 13.

As shown in FIG. 2, the cap 12 is fixed to the body 13

2 by means of bolts 18; screws 19 are arranged to clamp the cutters 20 in the slots formed between the cap and body, and screws 21 function to control the depth of the cut made by the cutters. The position of the knurlers 22 is similarly controlled by the screws 23 and 24. Each of the tool adjusting and clamping screws 19, 21, 23 and 24 has at its outer end a hexagonal recess 25 (FIG. 3) which cooperates with a similarly shaped wrench for adjusting the height of the tools and for clamping them in place. As pointed out above, operation of the device is effected by rotating the knurler and cutter with the knurler in advance of the cutter and with the cutter adjusted to cut to a depth slightly greater than that of the indentations produced by the knurl.

While four cutters are shown, more or fewer cutters may be provided depending on the circumstances under which the device is operated. The same is true of the knurlers 22 which are illustrated as arranged to indent one corner of the metal to be cut but may be of a type to provide indentations parallel with the cutting face of the cutter.

I claim:

In a device for trimming the edge of a tubular member, the combination of
  a pilot extensible into said tubular member and having a radial extension adapted to engage the inner periphery thereof,
  a body supported by said pilot and rotatable with respect thereto, said body having on its outer circumferential periphery a plurality of longitudinal grooves alined with the outer edge of said extension,
  a cap fixed to said body and extending over said circumferential periphery,
  a cutter having its shank in one of said grooves and extending therefrom toward said edge,
  means extending through said cap against the end of said cutter shank for adjusting the spacing between said cutter and said edge,
  means extending through said cap against a side of said cutter shank for locking said cutter shank to said body,
  a knurler having its shank in another of said grooves and extending therefrom toward said edge,
  means extending through said cap against the end of said knurler shank for adjusting the spacing between said knurler and said edge,
  means extending through said cap against a side of said knurler shank for locking said knurler shank to said body, and
  means whereby a rotational movement may be imparted to said cap and said body.

References Cited in the file of this patent

UNITED STATES PATENTS

| | | |
|---|---|---|
| 2,102,707 | Holhut | Dec. 21, 1937 |
| 2,323,700 | Bailey | July 6, 1943 |
| 2,328,098 | Remington et al. | Aug. 31, 1943 |
| 2,362,779 | Stevens | Nov. 14, 1944 |
| 2,416,774 | Rosenblatt | Mar. 4, 1947 |
| 2,826,803 | Sterling | Mar. 18, 1958 |
| 2,828,530 | Charschan | Apr. 1, 1958 |
| 2,832,133 | Giacosa | Apr. 29, 1958 |
| 2,855,994 | Kammerer | Oct. 14, 1958 |